US008027868B1

(12) United States Patent
House et al.

(10) Patent No.: US 8,027,868 B1
(45) Date of Patent: *Sep. 27, 2011

(54) TRADE AREA ANALYZER

(75) Inventors: Ronald I. House, Stillwell, KS (US); Drew S. Thompson, Leawood, KS (US); Jared Williams, Lees Summit, MO (US); Robert Phillips, Stilwell, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/583,565

(22) Filed: Oct. 19, 2006

Related U.S. Application Data

(63) Continuation-in-part of application No. 11/425,526, filed on Jun. 21, 2006.

(51) Int. Cl.
*G06F 17/30* (2006.01)
(52) U.S. Cl. ...................................... 705/7.34
(58) Field of Classification Search ............... 705/10, 705/7.34
See application file for complete search history.

(56) References Cited

U.S. PATENT DOCUMENTS

| | | | |
|---|---|---|---|
| 4,972,504 | A | 11/1990 | Daniel, Jr. et al. |
| 5,331,544 | A | 7/1994 | Lu et al. |
| 6,272,472 | B1 | 8/2001 | Danneels et al. |
| 7,287,002 | B1 * | 10/2007 | Asher et al. ............ 705/26.8 |
| 7,289,814 | B2 | 10/2007 | Amir et al. |
| 7,305,364 | B2 | 12/2007 | Nabe et al. |
| 7,346,597 | B2 * | 3/2008 | Dumas ......................... 706/58 |
| 7,401,048 | B2 | 7/2008 | Rosedale et al. |
| 7,454,412 | B2 | 11/2008 | Diewald et al. |
| 2002/0000999 | A1 * | 1/2002 | McCarty et al. ............ 345/764 |
| 2003/0097295 | A1 | 5/2003 | Kiefer |
| 2003/0126146 | A1 | 7/2003 | Van Der Riet |
| 2004/0117358 | A1 | 6/2004 | von Kaenel et al. |
| 2005/0055275 | A1 | 3/2005 | Newman et al. |
| 2006/0009998 | A1 | 1/2006 | Kelly et al. |
| 2006/0100912 | A1 | 5/2006 | Kumar et al. |
| 2007/0110032 | A1 * | 5/2007 | Pimpler et al. ............ 370/352 |

OTHER PUBLICATIONS

Dramowicz, Ela. "Retail Trade Area Analysis Using the Huff Model." Directions Magazine. Retrieved from the Internet [URL: http://www.directionsmag.com/articles/retail-trade-area-analysis-using-the-huff-model/123411], dated Jun. 2, 2005.*
MacDonald, Eliot Hugh. "GIS in Banking: Evaluation of Canadian Bank Mergers." Canadian Journal of Regional Science, vol. XXIV, No. 3, pp. 419-442, Autumn 2001.*
Cohen, Eric. "Miles, Minutes, & Custom Markets." American Demographics, p. 18, Jul./Aug. 1996.*
Zaddack, Gerald N., "Real Estate Applications for GIS: A Review of Existing Conditions & Future Opportunities." Real Estate Issues, vol. 23, No. 4, p. 13, Winter 1998/1999.*
Williamson, Christopher et al. "Resellers Make Census: GeoLytics' CD and GeoVue's iSITE." Geospatial Solutions, vol. 12, No. 6, p. 46, Jun. 2002.*

(Continued)

*Primary Examiner* — Susanna M Meinecke Diaz

(57) ABSTRACT

Methods and computer-readable media having computer-usable instructions for evaluating, analyzing and displaying trade information for a user. Customer addresses are received, and then a buffer area is created around each of the customer address. The buffer area for each address is combined to generate at least one aggregated area that is then disaggregated to define a polygon which is useful for generating a density map that is added to a data base. The data base is analyzed to indicate an ideal retail location for a new store, and/or determine which retail store to relocate or close.

16 Claims, 10 Drawing Sheets

OTHER PUBLICATIONS

ESRI. "What's New in ArcGIS® Business Analyst 9.3" An ESRI White Paper, Sep. 2008.*

Dramowicz, Ela. "Retail Trade Area Analysis Using the Huff Model." Directions Magazine. Retrieved from the Internet [URL: http://www.directionsmag.com/articles/retail-trade-area-analysis-using-the-huff-model/123411], dated Jul. 2, 2005.*

Thrall, Grant Ian. "MapInfo Professional 8.5: Internet-Enabled GIS." Geospatial Solutions. Sep. 1, 2006, retrieved from [URL: http://spectroscopyonline.findanalytichem.com/spectroscopy/article/articleDetail.jsp?id=373365].*

Thrall, Grant Ian, et al. "Trade Areas and LSPs a Map for Business Growth: By Correlating Trade Areas and Customer Profile Data, Retailers Can Visualize Market Penetration and Assess Options for Future Expansion." Geospatial Solutions, Apr. 1, 2003, retrieved from [URL: http://www.esri.com/library/reprints/pdfs/geospatial-busanal.pdf].*

"ESRI ArcUser Magazine Oct.-Dec. 1998—Coming to Terms" http://web.archive.org/web/20010218111614/http://www.esri.com/news.arcuser/1098/terms.html.

* cited by examiner

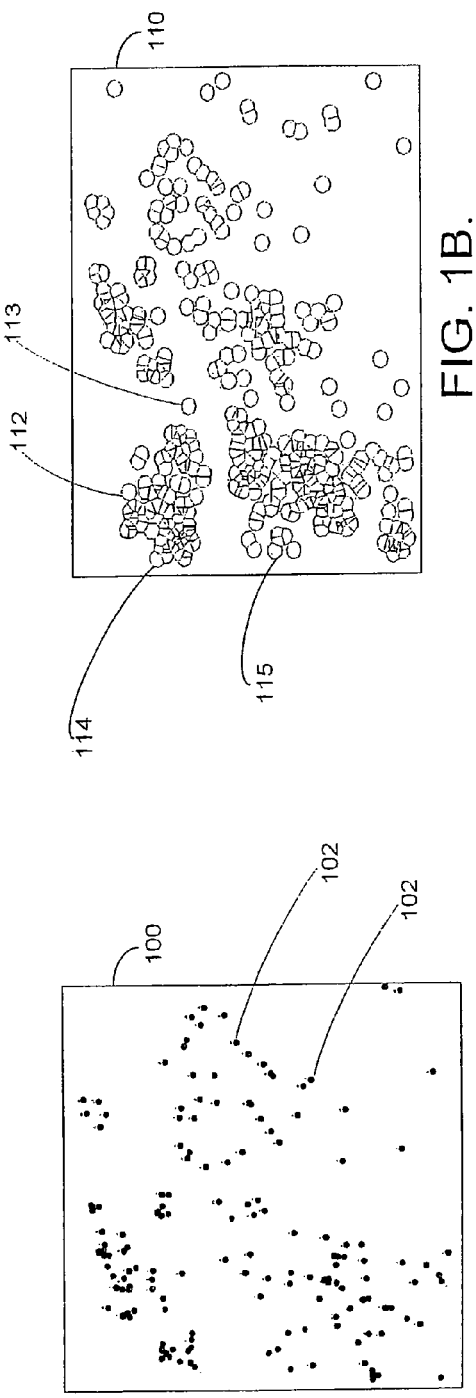
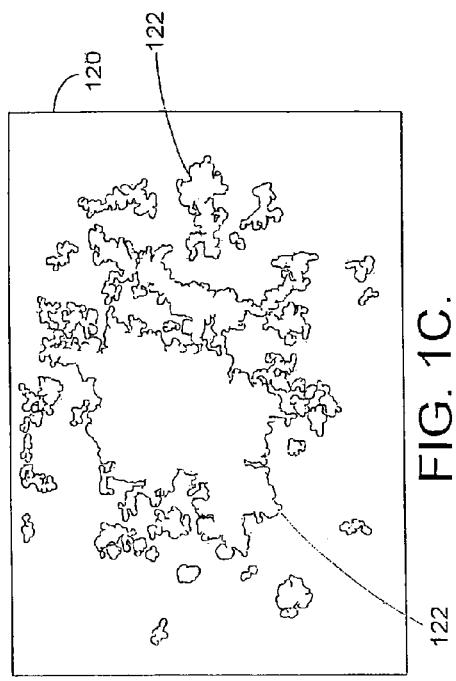
FIG. 1A.
FIG. 1B.
FIG. 1C.

TRADE AREA ANALYZER

CROSS-REFERENCE TO RELATED APPLICATIONS

This application is a continuation-in-part application that claims the benefit of U.S. patent application Ser. No. 11/425,526, filed Jun. 21, 2006, the disclosure of which is incorporated herein by reference.

STATEMENT REGARDING FEDERALLY SPONSORED RESEARCH OR DEVELOPMENT

Not Applicable

BACKGROUND OF THE INVENTION

This invention relates in general to trade databases and in particular to methods for analyzing data contained in such trade databases.

A trade database can capture a lot of information that is crucial in making many important business decisions. For instance, e-commerce data from a well-defined trade area may contain information regarding where existing customers reside and where they go to do their shopping. It may also contain information regarding where potential customers are located and how they could be better attracted to a business. The data may help find a good location for a new retail store or a customer service center. It may also help a business decide to close down or to relocate a retail store or a customer service center. Trade area data can help maximize existing business resources by freeing up resources that have been misdirected and using such resources to attract potential business or customers. For instance, a mobile communication service provider may be able to find out whether existing service subscribers are adequately served by retail stores and/or service centers that cover the area in which the subscribers reside. The service provider may also find out where in an area of interest the majority of potential subscribers are located so that it can place a new retail store or a customer service center at a location in the area near the potential subscribers, if lack of service or sales representation is a cause of failing to attract them.

Often, however, such potential benefits that are associated with utilizing trade area data are defeated because the information included is not presented in a useful way. As a result, service and sales facilities such as retail stores and customer service centers are often located too far from where existing and potential customers live and/or shop. In other circumstances, stores and/or service centers are added even though one such facility can adequately serve all of existing and potential customers. Precious resources and efforts as well as some of existing and potential customers can be lost when such sales and service facilities are misplaced as the result of faulty planning.

Currently, processes of defining trade areas rely on rather crude techniques. For example, a business often places its first sales or service facility in a busy retail outlet, e.g. a shopping mall in an area, and the next facility is located outside a radial distance from the first facility. However, this crude technique does not capture shopping habits. Nor does it capture factors that are intimately connected to buying a particular product and/or subscribing to a related service. For instance, suppose two large shopping malls are separated by a river or a large interstate highway, but are less than a mile apart from each other. Suppose further that one of the shopping mall has a mega movie theater that shows all the major movies that are currently playing. The other mall has large clothing outlets. If it is found that moviegoers are not likely to visit the clothing outlets, and vice versa, then it would make sense to put one facility in each shopping mall even though the two malls are relatively close to each other. Accordingly, there is a need for a process of evaluating trade areas that is capable of capturing the necessary details and presenting them in a way that can help a business make marketing decisions, e.g. direct staffing, invest financial resources, and establish locations where they can achieve the maximum efficiency and/or capacity.

BRIEF SUMMARY OF THE INVENTION

This invention relates to methods for analyzing data contained in trade databases.

The present invention contemplates methods and computer-readable media having computer-usable instructions for evaluating, analyzing and displaying trade information for a user. Customer addresses are received, and then a buffer area is created around each of the customer address. The buffer area for each address is combined to generate at least one aggregated area that is then disaggregated to define a polygon which is useful for generating a density map that is added to a data base. The data base is analyzed to indicate an ideal retail location for a new store, and/or determine which retail store to relocate or close.

More specifically, the present invention contemplates a method of analyzing trade area information that includes developing a trade area data base that covers a geographical area and then selecting a specific location within the geographical area covered by the trade area data base. The data for the selected location is withdrawn from the trade area data base and displayed. At least a portion of the selected data is selected for analysis. The selected data is then analyzed.

The invention also contemplates that map overlays may be used to filter the selected data during the analysis. Additionally, the method may produce any number of graphical reports for displaying the analyzed data. Furthermore, specific parameters may be introduced for the analysis of the selected data.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 1A-C are exemplary diagrams illustrating how customer locations of an area may be manipulated to evaluate trade area information during development of a trade area data base in the method shown in FIG. 1.

DETAILED DESCRIPTION OF THE PREFERRED EMBODIMENT

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM. ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies, combinations of the above are included within the scope of computer-readable media.

Figure 1:
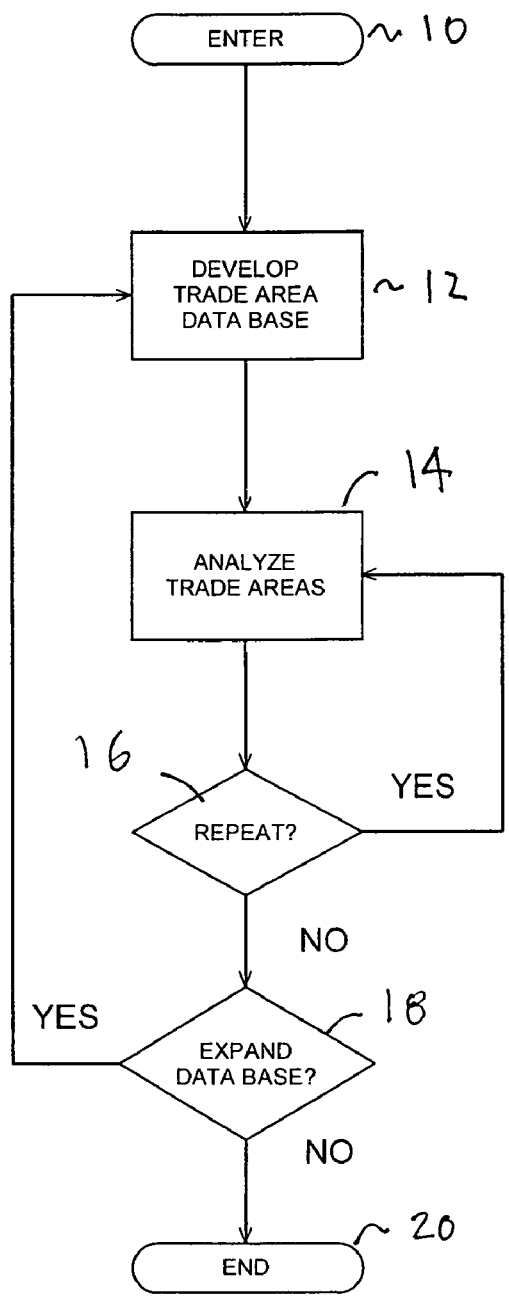
FIG. 1 is a flow diagram that provides an overview of a method for the manipulation and analysis of trade area data in accordance with the present invention.

Referring now to the drawings, there is illustrated in FIG. 1, a flow chart providing an overview of a method of data assembly and analysis in accordance with the present invention. The method enters through block 10 and proceeds to functional block 12 where a trade area data base is developed. The method then continues to functional block 14 where data contained in the trade area data base developed in block 12 is analyzed. After analyzing the trade area data, the method advances to decision block 16 where the user is queried regarding further analysis. If further analysis is desired, the method transfers back to functional block 14 and continues to analyze data in the current data base. If, in decision block 16, no further analysis is desired, the method transfers to decision block 18.

In decision block 18, the user is queried regarding further development of the data base. For example, following his analysis, the user may desire to expand the data base to support continued analysis. If expansion of the data base is desired, the method transfers back to functional block 12 and continues as described above. If, in decision block 18, no expansion of the data base is desired, the method ends at block 20.

It will be appreciated that the flow diagram shown in FIG. 1 is exemplary and that the invention also may be practiced with a different sequencing and/or timing of the steps. For example, development of the data base may be on-going with continuous updating as new data becomes available. Additionally, the steps of developing the trade area data base and analyzing the trade areas may be separated in time and location. Thus, the data base may be assembled in a central location with the analysis being carried out at satellite locations with remote access to the central data base as needed. Additionally, the steps of developing the data base and analyzing the data contained therein may be carried out concurrently.

Key to the development of the trade area data base, as shown in functional block 12 of FIG. 1, is collection and evaluation of data associated with a specific location within a trade area. FIGS. 1A through 1C exemplary diagrams illustrating how customer locations of an area may be manipulated to evaluate trade area information, according to embodiments of the present invention. Note that each of the three figures has been generated from a different set of data. FIG. 1A illustrates an exemplary sample of customer locations in an area 100. Each location is represented by a point or dot 102. In one embodiment, a customer's location represents an address that is geographically located in the area 100 and associated with the customer's account. Customer locations may be received in a variety of formats. In one embodiment, a customer point file is received for geographical display of customer locations. In another embodiment, a text file containing customer addresses is received to be mapped for a display.

FIG. 1B illustrates a plurality of aggregated areas 114, 115 located in an area 100. In this embodiment, a buffer area 112 is created around each of customer locations (like points 102 shown in FIG. 1A) and the resulting buffer areas 112 are combined to form the aggregated areas 114, 115. In one embodiment, the radius of each buffer area 112 is selected to be about 0.25 miles. Some buffer areas 112 may be filtered out, if desired. In one embodiment, isolated individual buffer areas 113 that do not form a part of an aggregated area 114, 115 may be removed. In another embodiment, an aggregated area made up of a small number of buffer areas 115 which are located in close proximity to a major aggregated area 114 may be integrated into the major aggregated area 114. Then such major aggregated areas 114 might be disaggregated as shown in FIG. 1C.

FIG. 1C illustrates a plurality of exemplary polygons 122 that represent the trade area in an area 120. The polygons 122 are formed from aggregated buffer areas 114, 115, as shown in FIG. 1B, which are then disaggregated as shown in FIG. 1C. In one embodiment, all but the outer most boundaries of the aggregated areas 114, 115 are removed to define the polygons 122. In summary, location points 102 are generated as shown in FIG. 1A. Then buffer areas 112 are created to form aggregated areas 114, 115 as shown in FIG. 1B. Finally, polygons 122 are defined from the aggregated areas 114, 115 as shown in FIG. 1C.

Figure 2:
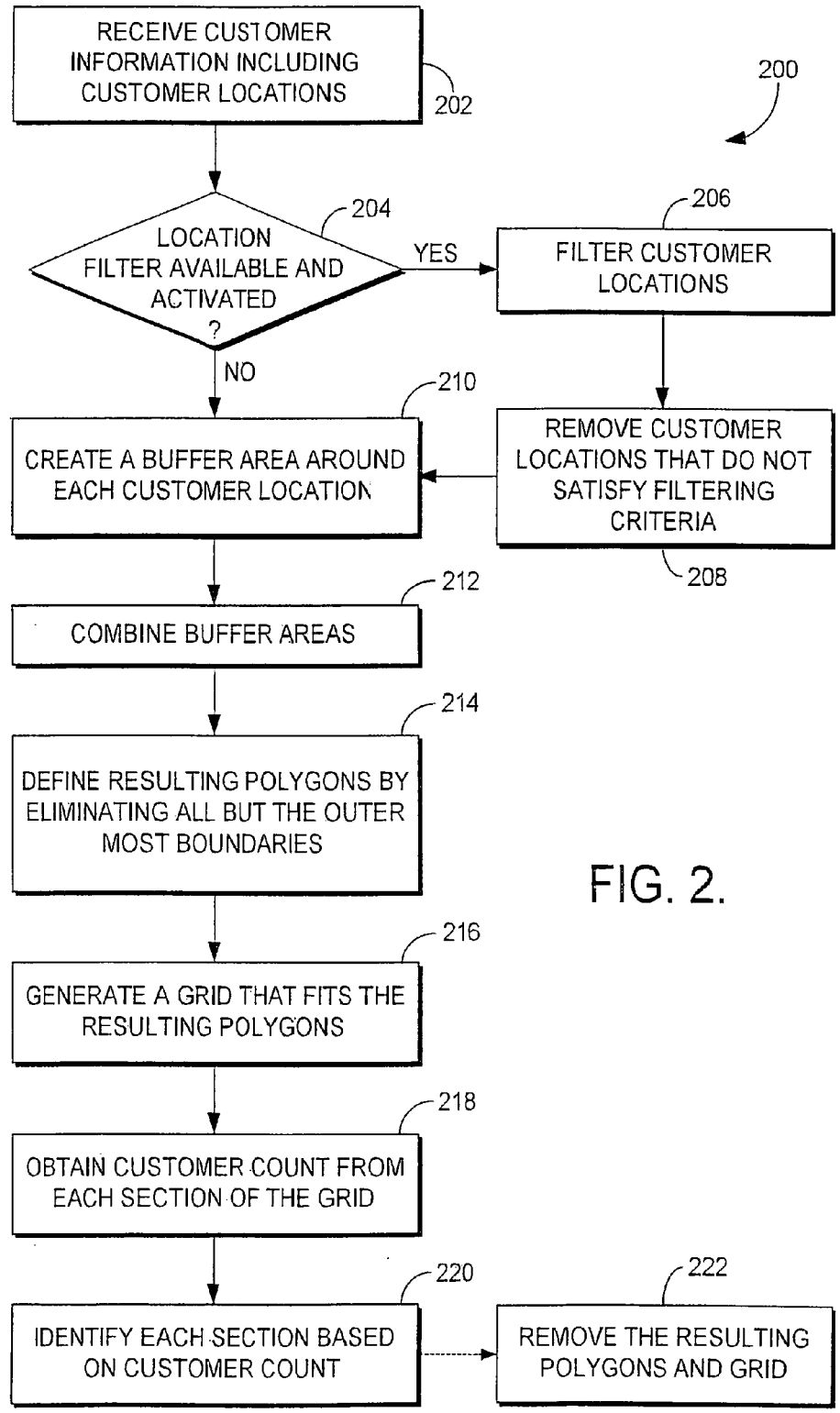
FIG. 2 is a flow diagram illustrating a method in accordance with an embodiment of the present invention for evaluating trade area information that is used in the method shown in FIG. 1.

FIG. 2 is a flow diagram illustrating a method 200 in accordance with an embodiment of the present invention for evaluating trade area information. FIGS. 1A-C will be referred to along with FIG. 2 to illustrate some aspects of the method 200. At 202, the method 200 receives customer information. The customer information may include data relating to customer locations. In one embodiment, customer locations that are associated with a particular area may be read in from a customer point file or a spatial object that can be graphically displayed as shown in FIG. 1A. In another embodiment, the information includes customer locations that are associated with a retail store or a local service center and may be read in from a text file. One of ordinary skill in the art would know how such customer locations can be obtained in a variety of ways. The customer information may also include an account information and transaction records. In one embodiment, the customer information includes customer credit ratings. In another embodiment, the customer information includes previous addresses of customers and information regarding address changes.

At 204, the method 200 determines whether at least one location filter is available and active. In one embodiment, location filters are used to remove customer locations in accordance with filtering criteria. For example, suppose a telecommunication service provider wishes to determine whether a local retail store covering a populated area must be relocated, and thus wishes to define a trade area that is associated with the particular retail store. In other words, the provider wishes to limit the perimeters of the trade area so that it encompasses only the customers who are likely to be served by the particular retail store. Therefore, information of those customers who are not likely to be served by the retail store is removed so that the trade area can be defined more accurately. Suppose that the retail store is located in Kansas City area. Further suppose that a customer who resides in Chicago, Ill. happened to have his mobile phone serviced in the retail store while visiting Kansas City for just few days. That customer, for all likelihood, is not going to come back to Kansas City again for further assistance or service. By removing that customer and similarly situated customers from the list of customers who are associated with the retail store by filtering, the resulting data can define the geographic customer base more accurately.

Location filters may employ a variety of filtering criteria to better fit purposes for which a trade area may be defined. In one embodiment, for example, a driving distance and/or driving time from a retail store or local service station may be used as a filtering criterion. For instance, information of only those customers who reside within 20 minutes of driving time or within 10 miles of driving distance to a retail store may be used to define a trade area for the retail store to predict the impact of closing down or relocating the retail store more realistically. In another embodiment, the nature of a past transaction may be used as a filtering criterion. For instance, transaction records could be filtered so that it is restricted to those customers who purchased a mobile phone and/or who subscribed to services at a retail store, whereas customers who came to the retail store to make payments are excluded. In yet another embodiment; the frequency of past transactions may be used as a filtering criterion. For instance, information of only those customers who have visited a retail store more than once may be used to determine a new location for a retail store.

If the method 200 determines that at least one location filter is available and active, customer locations are filtered at 206. At 208, those locations that have been filtered out by the location filter are removed. If, however, the method 200 determines either that there is no location filter or that none of available filters is yet activated, all the customer locations that have been received at 202 are used to define a trade area. One skilled in the art would know how to filter out data such as customer locations. In one embodiment, for example, a SQL SELECT clause may be used to filter out customer locations in a database that fall outside of a set of conditional parameters in a SQL WHERE clause. At 210, the method 200 creates a buffer area 112 around each of the customer locations as shown in FIG. 1B. In one embodiment, the radius of the buffer area is about 0.25 miles. In another embodiment, the radius of the buffer area may be between 0.2 miles and 0.29 miles.

At 212, the buffer areas 112 that are created for each of the customer locations are combined to form at least one aggregated area 114. At 214, the method 200 disaggregates the aggregated area 114 to define polygons 122 that may represent a trade area as shown in FIG. 1C. In one embodiment, the method 200 disaggregates by removing all but the outer most boundaries of the aggregated area 114. Additional layers may be used to help a user make decisions. One skilled in the art would know how to filter, create buffers, create aggregates, and disaggregate to form polygons. For example, commercial software tools such as MapInfo, MapGuide, and Raster Workshop may be used to help accomplish such tasks. For instance, MapInfo provides its own script language and a library of graphical functions that can be invoked by another application program. However, there are other ways to accomplish the same tasks. There are also other tools that offer similar functionality. Returning to the telecommunication service provider example, suppose that the provider wishes to find out an ideal location for a new retail store in a city area. The provider wishes to obtain a trade area that encompasses the particular city area and that includes all the customers therein. Once the polygons 122 are defined, the method 200 may use layers containing different information to help the provider determine the ideal location for the new retail store, in one embodiment, the method 200 may utilize layers containing graphical items such as, but not limited to, streets, lakes, ponds, public parks, schools, and shopping malls. In another embodiment, the method 200 may utilize layers containing the locations of retail stores owned and/or operated by the provider's competitors. By including a competitor-locations layer, a new store location can be placed after considering both current customer habits as well as competitive advantage.

At 216, the method 200 generates a grid that fits the polygons 122 generated at 214. In one embodiment, the method 200 overlays the polygons 122 with a grid of sections with length of about 0.25 miles. In another embodiment, the method 200 uses a grid of sections with length between 0.2 miles and 0.29 miles. In yet another embodiment, the method 200 overlays the polygons 122 with a grid of squares. At 218, the method 200 obtains a customer count from each section of the grid. In one embodiment, the method 200 counts the number of customer locations that fall within each square of an overlaid grid of squares. One of ordinary skill in the art would know how to generate a grid, overlay a polygon with the grid, and count a set of data points that fall within each section of the grid. For instance, a commercially available tool that provides a library of graphical functions may be used to accomplish such tasks.

At 220, the method 200 identifies each section of the grid based on the customer counts. Method 200 also can use different colors to identify each square of an overlaid grid of squares. For instance, red could be used for a customer count between 150 and 200 and pink could be used for a customer count between 50 and 100. Alternatively, distinctive shading could be used to identify different customer counts for each section of a grid. In yet another embodiment, the method 200 may use both different colors and shades. The method 200 may also distinguish sections of the grid for reasons other than, and in addition to customer counts. In one embodiment, method 200 may use customer information such as customer credit ratings. For example, different colors could be used to indicate customer counts while different shades are used to indicate customer credit ratings, thereby allowing the provider to target a specific segment of customers. For example, a user might select high end products for placement in a shaded area which indicates high credit ratings. In another embodiment, the method 200 may use customer information regarding address changes and previous addresses of customers. For instance, different shades may be used to indicate customer counts while different colors may be used to indicate the length of residency of customers. By comparing shades and colors for a given area at different times, the provider may also learn moving trends of its customers over a time period. For instance, the provider may learn that its most targeted class of customers is gradually moving out of city areas and into urban residential areas near cities. This information would help the provider more adequately adapt to these transitions.

At 222, the method 200 may remove the polygons 122 and the grid, leaving only the colors, shades, or yet another means used to identify each section of the grid. In one embodiment, the colored squares of a grid are further smoothed out to generate a density map within a particular area. One skilled in the art would know how to smooth out colored squares of a grid. For example, commercial software tools such as MapInfo may be used to help accomplish the task. For instance, MapInfo provides a library function that can be invoked by a user through its user interface or by an application program through MapInfo scripts inserted therein. The method 200 may be used to define accurate geographical trade information for cities, states, and even the entire nation. The method may be also used to accurately evaluate and display trade information for any randomly chosen populated area.

Figure 3:
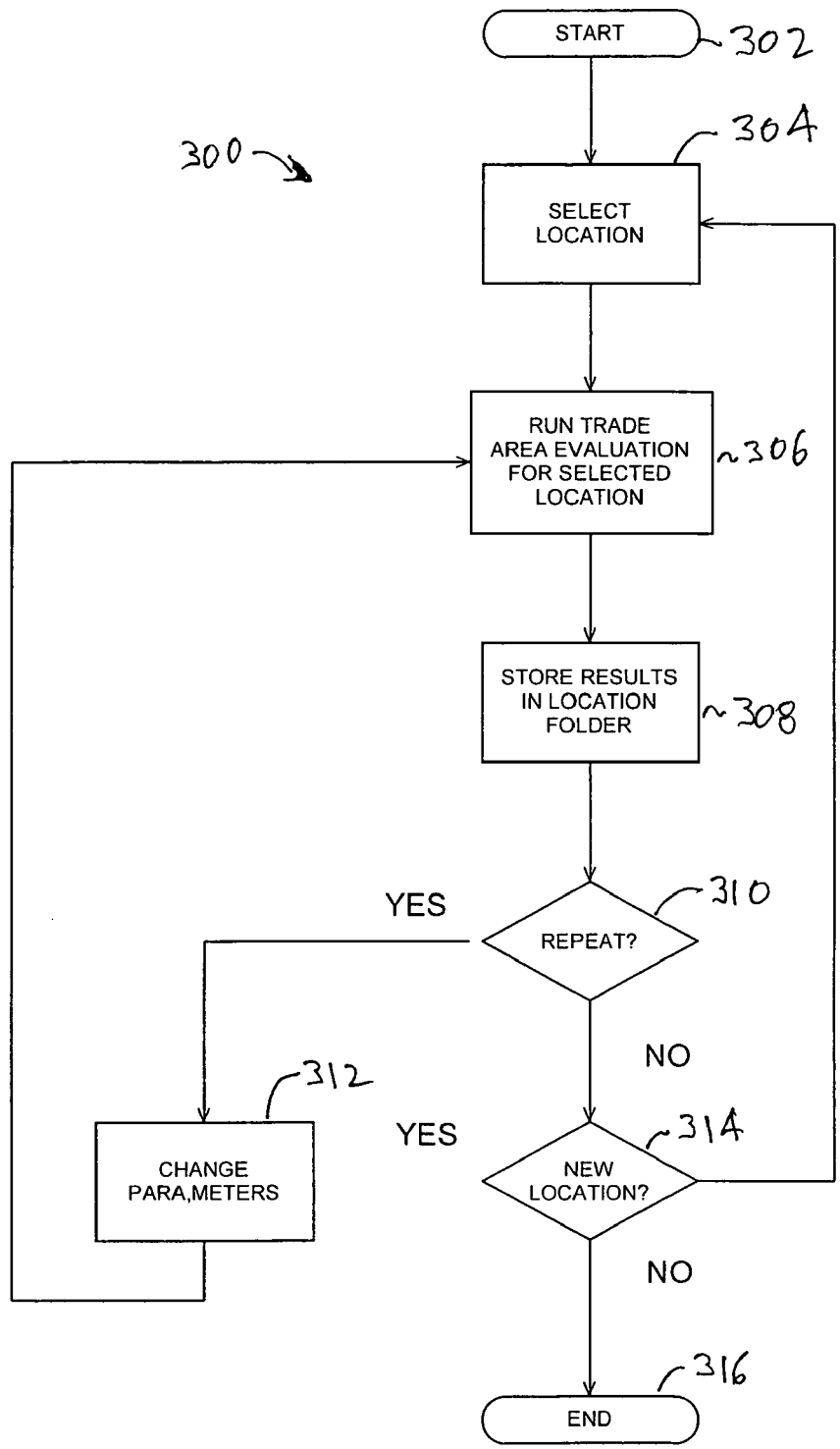
FIG. 3 is a flow diagram illustrating a method for developing a data that is used in the method shown in FIG. 1.

The invention also contemplates a method 300 for development of a trade area data base that utilizes the above described data evaluation method. The method 300 for data base development, which is included in functional block 12 of FIG. 1, is illustrated by the flow diagram shown in FIG. 3 and comprises multiple applications of the method shown in FIG. 2 for each of a plurality of locations. The resulting trade area data base is then used to analyze the trade areas, as shown in functional block 14 and as will described below.

The data base development method 300 is entered through block 302 and proceeds to functional block 304 where a specific location, such as a store location is selected. The development method 300 then advances to functional block 306 where the trade information evaluation method 200, as described above and illustrated with the flow diagram shown in FIG. 2, is run for the selected store location. The invention contemplates that the evaluation method 200 is run to evaluate the trade area for that particular location with respect to selected parameters, such as, for example, a selected year or other time period which may be more or less than a year in duration, or for selected location filters, as also described above. After completing the evaluation method 200, the results are stored in a location folder, as shown in functional block 308. In the preferred embodiment, the location folder consists of a portion of a computer memory; however, other storage devices and media may also be utilized. In the preferred embodiment, the stored data is identified with a multi-digit code with the first digits representing the store location, the middle digits the time period, such as month and year during which the data was collected, and the final digits representing the data itself, such as new product sales, service sales and income from automatic bill payment center. The data base development method 300 then advances to decision block 310.

In decision block 310, it is determined whether the information evaluation method 200 should be repeated for the same location, but with different parameters, such as a different time period and/or the use of a different location filter to sort the data for such income producing functions as sales, service or payment of bills. If it is decided to repeat the evaluation method 200 for the same location, the development method 300 transfers to functional block 312 where the selected parameter is changed. The development method 300 then returns to functional block 306 where the evaluation method 200 is repeated with the changed parameter. As a result, another set of results are stored in the folder in functional block 308.

If in decision block 310, it is decided to not to repeat the method for the same location, the data base development method 300 transfers to decision block 314 where it is decided whether the development method 300 should be repeated for a second location, such as another store. If it decided to repeat for another location, the development method 300 transfers to functional block 304 where another store is selected for data base development. The development method 300 then continues, as described above, to process data for the newly selected store location, to include multiple iterations of the evaluation method 200 for a plurality of selected parameters. If, in decision block 316, it is determined that data has been developed for a sufficient number of store locations, the determination method 300 transfers to end block 316.

Figure 4:
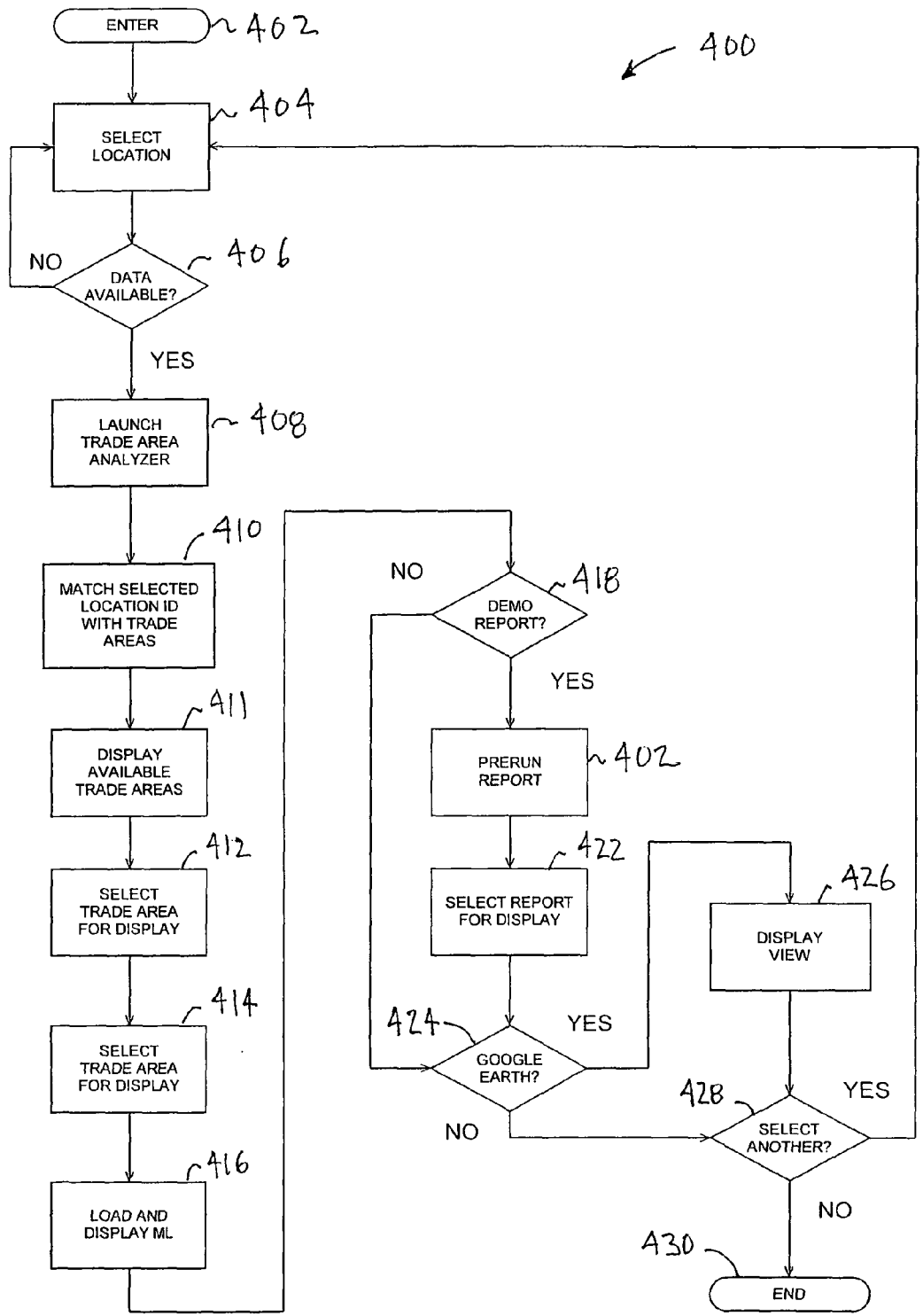
FIG. 4 is a flow diagram illustrating a method for analyzing data contained in the data base developed with the flow diagram shown in FIG. 3 that represents the third functional block shown in FIG. 1.
Figure 5:
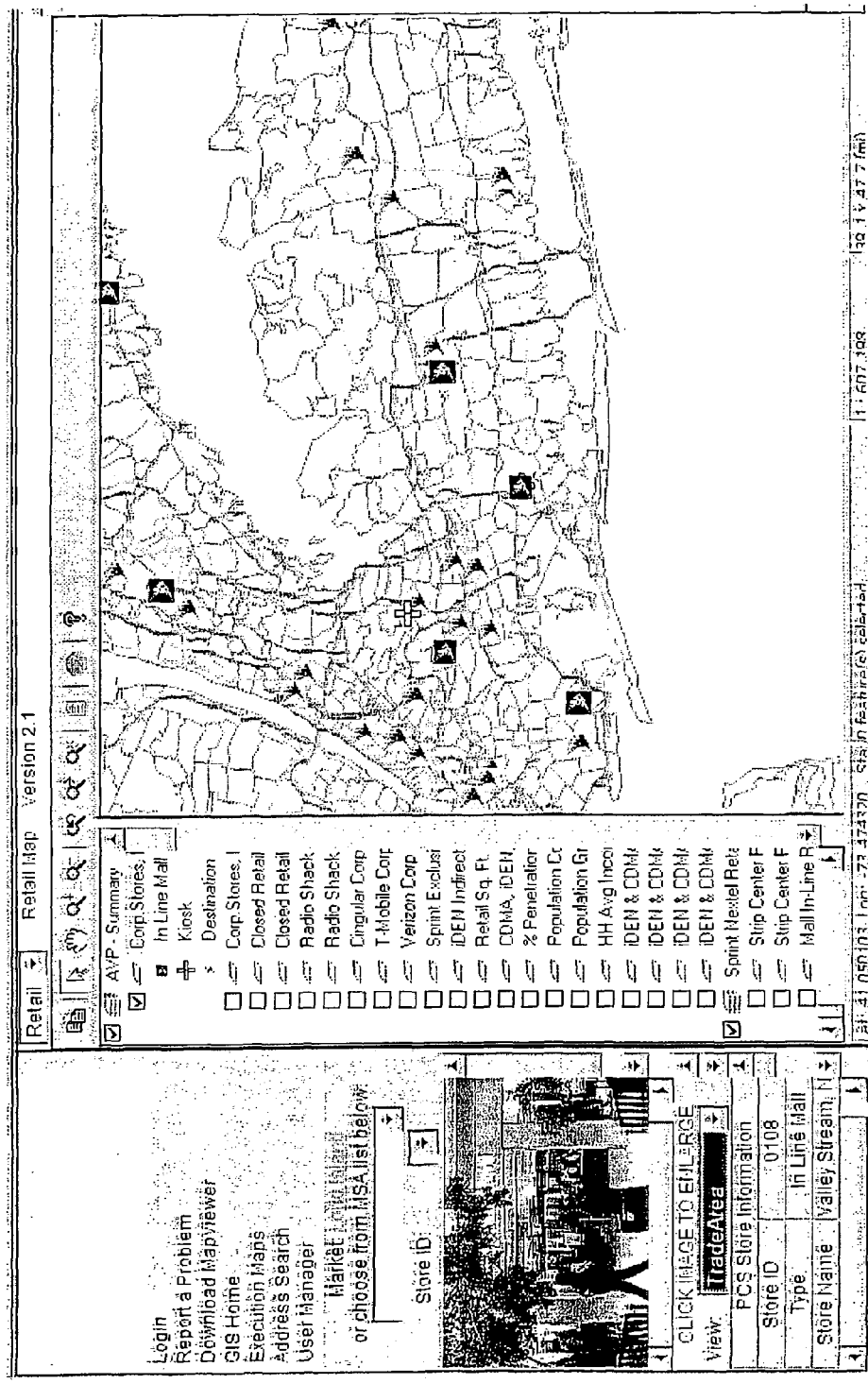
FIG. 5 illustrates a typical computer screen display utilized at the beginning of the method of the flow diagram shown in FIG. 4.

It is apparent from the above description, that the data base determination method 300 is capable of generating a voluminous amount of data regarding store locations. Accordingly, the present invention also includes a method 400 for analyzing the data. The analysis method 400 is shown as functional block 14 in FIG. 1 and illustrated by the flow diagram shown in FIG. 4. The analysis method 400 is entered through block 402 and proceeds to functional block 404 where a specific store location is selected. In the preferred embodiment, the location selection may be aided by a graphical display on a computer screen of locations, as illustrated in FIG. 5. As indicated to the left of the screen in FIG. 5, a user may select a particular store location from a variety of available locations, to include, to name a few, stand alone stores, stores located in enclosed malls, and stores located in mall in line retail centers. It also is noted that the table to the left of the display in FIG. 5 again may include data for locations owned or leased by different companies. Thus, in the example of FIG. 5, location of communication media outlets are shown and include outlets belonging to a number of different companies, such as Sprint, Cingular, T-Mobil, Verizon and Radio Shack. The data base may include data for both functioning outlets and closed outlets. While a graphical map display is utilized in the preferred embodiment, it will be appreciated that other methods of identifying a location may be utilized, such as, for example entering the address of the location or an alpha numerical designation code for the location via a computer keyboard. Once a specific store location is selected, the analysis method 400 advances to decision block 406.

In decision block 406, the analysis method 400 determines whether a data file is available in the data base folder for the selected store location. If data is not available, a message is displayed to inform the user and the analysis method 400 transfers back to functional block 404 where another specific location is selected from the map shown in FIG. 5. If, however, it is determined in decision block 406 that data for the selected location is available, the analysis method 400 transfers to functional block 408 where the analysis portion of the method is launched.

Figure 6:
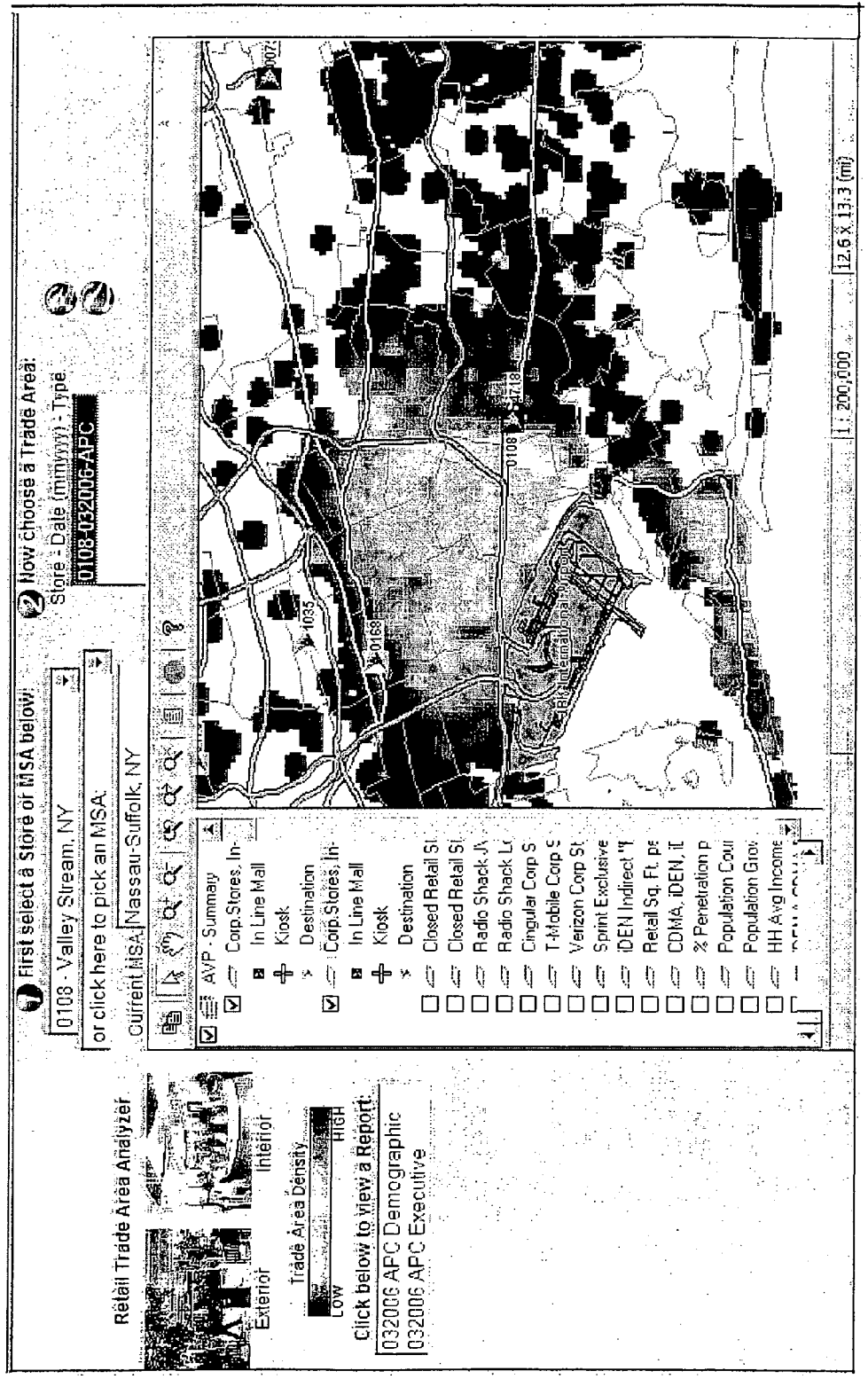
FIG. 6 illustrates a typical computer screen display of results generated by the method of the flow diagram shown in FIG. 4.

The analysis method 400 then continues to functional block 410 where the identifier for the selected store location is matched to the stored files in the location folder. Because the data base most likely will include a plurality of files for any one location, the available files for the selected location are displayed in functional block 411. For example, if there are multiple files for different time periods, all of the files available for the location are displayed to allow the user to select a file corresponding to a particular time period of interest in functional block 412. The analysis method 400 then advances to functional block 414 where, in the preferred embodiment, the selected trade area is then displayed on a computer screen. A typical screen display is shown in FIG. 6 where the different shades of gray represent different colors on the actual screen. The colors represent parameters of the displayed area. For example, the colors may represent customer density with red representing the highest density, blue the lowest density and other color and/or shades representing population densities between the extreme values. Alternately, the colors may represent other parameters, such as, for example, per capita income, types of dwelling units, or land usage, such as residential, commercial or industrial. Similar to the displays for the information evaluation 200 method described above, the display shown in FIG. 6 may also utilize shades of gray or shading in lieu of colors. Such a monochromatic display would be useful with printers that do have capability to reproduce colors. Again, a list of options is displayed along the left side of the screen. Use of a mouse to click on a particular option would then highlight that option upon the screen. Similar to the display in FIG. 5, the table to the left of the display in FIG. 6 may include data for locations owned or leased by different companies.

Similar to the filters or overlays described above for the information evaluation method 200, the analysis method 400 also provides a capability to superimpose a Trade area map layer. Accordingly, in functional block 416, the user may select a Trade area map layer for loading onto the displayed map. Each Trade area map layer contains additional data for the particular store location. For example, each Trade area map layer may represent a different time period. By adding a Trade area map layer, a user may view a trade area for a specific time frame. Thus, if data is available in monthly increments, a year of data may be assembled by adding 12 consecutive Trade area map layers to the display. Alternately, Trade area map layers may be selected to filter the displayed data. The analysis method 400 then advances to decision block 418. The invention contemplates that the Trade area map layers are generated by the user; however, commercially available products also may be utilized to generate the map layers.

Figure 7:
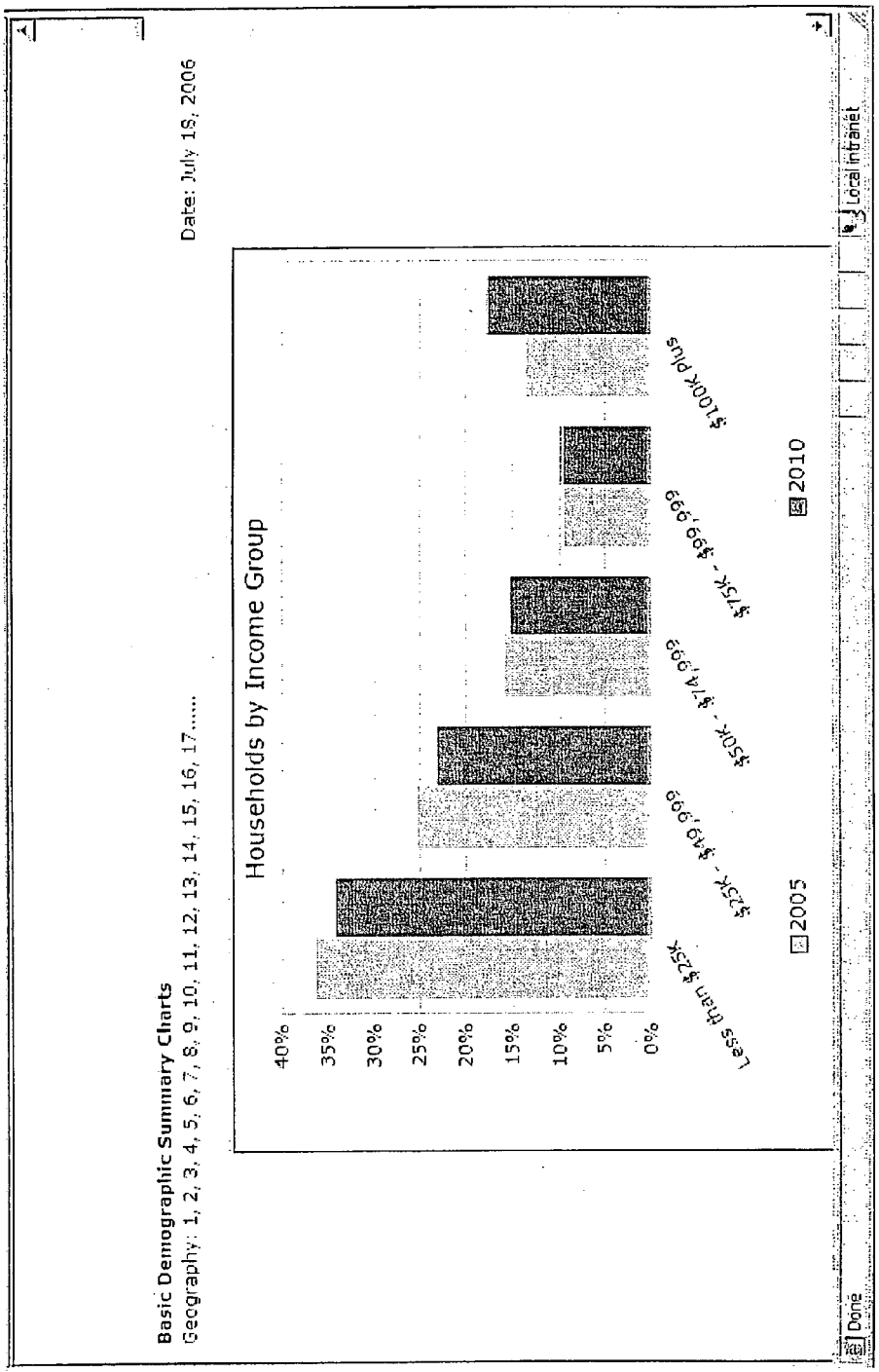
FIG. 7 is a typical demographic chart generated by the method of the flow diagram shown in FIG. 4.
Figure 8:
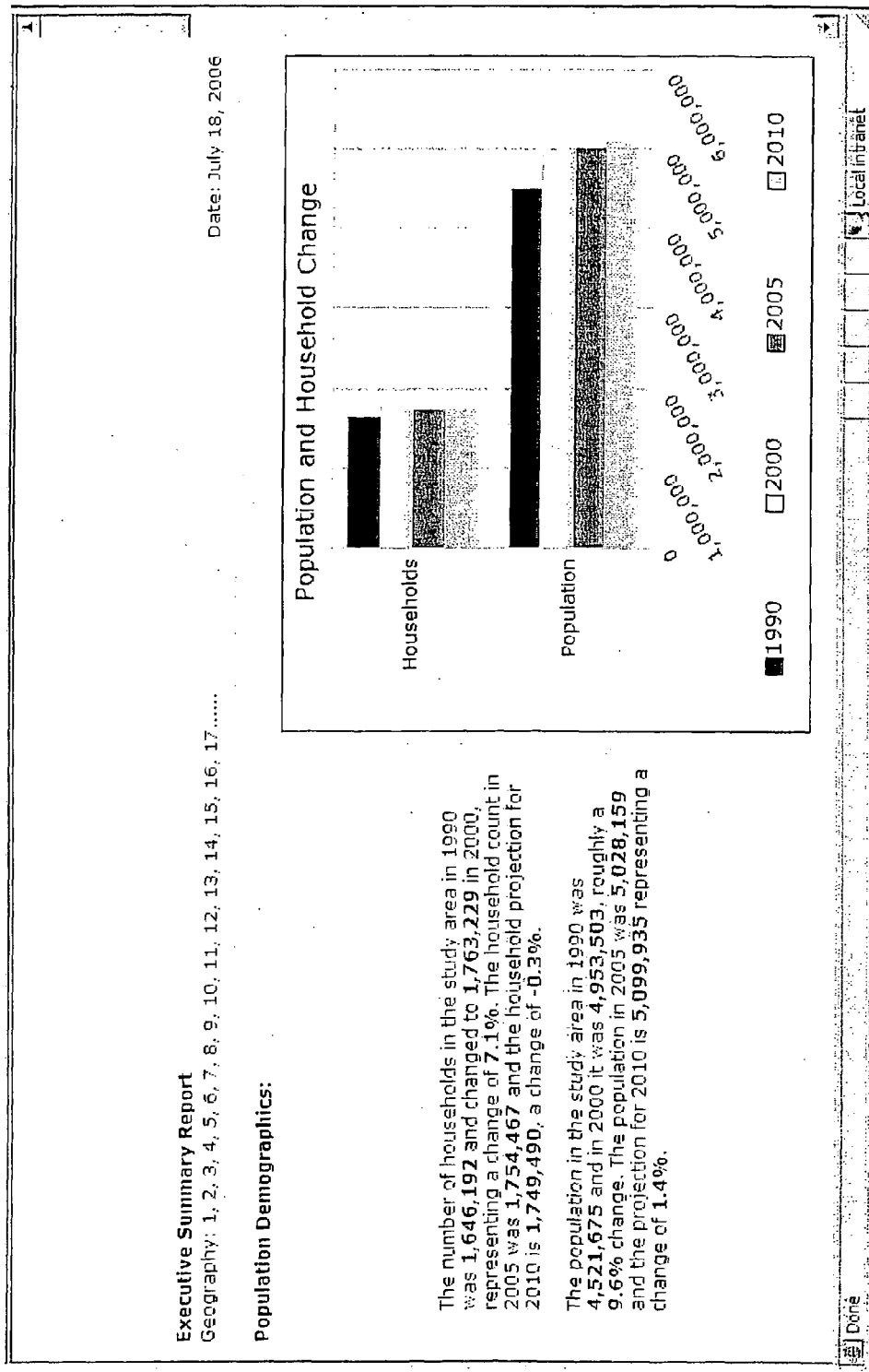
FIG. 8 is a typical executive summary report generated by the method of the flow diagram shown in FIG. 4.

In decision block 418, the user is queried as to whether graphical reports are desired. If such reports are desired, the analysis method 400 transfers to functional block 420 where demographic reports matching the trade area are listed for selection. Upon selection of a demographic report, the method advances to functional block 422 where the selected demographic report is displayed upon the computer screen. Any number of reports that correspond to criteria selected by the user may be generated by the method. A typical demographic report is illustrated in FIG. 7 where the number of households in the trade area is graphically displayed by income groups for two time periods. The method also can produce other demographic displays. Another available typical report is an Executive Summary Report, an example of which is shown in FIG. 8. The analysis method 400 further includes a capability for printing any of the reports or forwarding the reports to another location by any conventional method to include use of the internet. Once the reports have been displayed, the analysis method 400 continues to decision block 424. If, in decision block 418, the user does not desire that graphical reports are to be generated, the method transfers directly to decision block 424.

Figure 9:
FIG. 9 illustrates a computer display screen showing a map based presentation of results generated by the method of the flow diagram shown in FIG. 4.

In decision block 424, the analysis method 400 queries whether viewing of a Google Earth display is desired. If such a display is desired, the method transfers to functional block 426 where an overview display of the trade area is presented upon the computer screen. A typical display screen is shown in FIG. 9. Again, the different shades of gray in FIG. 9 represent colors and shades of colors that are indicative to the data being displayed. Alternately, shades of gray or shading may be utilized to display the results. While a Google Earth display is shown in FIG. 9, it will be appreciated that the invention also may be practiced with other commercially available graphical map displays. The analysis method 400 then continues to decision block 428. Returning to decision block 424, if the user does not desire to view a Google Earth display, the analysis method 400 transfers directly to decision block 428.

In decision block 428, the user is queried as to whether he desires to analyze another store location. If the user does desire to analyze another location, the method transfers back to functional block 404 where another location is selected. If, however, the user does not desire to analyze another location, the method transfers to end block 430 and the method is stopped.

It will be understood that certain features and sub-combinations described above are of utility and may be employed without reference to other features and sub-combinations and are contemplated within the scope of the claims. Not all steps listed in the various figures need be carried out in the specific order described. Additionally, while the preferred embodiment has been illustrated and described in terms of stores, it will be appreciated that the method also may be practiced for any number of different facilities, such as, for example, gasoline service stations, bank branches and restaurant chains. Again, the raw information may be limited to the data from one company or from multiple companies. Indeed, the invention contemplates that a data base may be developed by one company or governmental agency and made available for a fee for use by private or public entities.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of analyzing trade area information comprising the steps of:
   (a) providing a computer and a computer-storage media device;
   (b) developing a trade area data base that covers a geographical area that includes the following sub-steps:
      (b1) receiving customer information that includes customer locations within a trade area;
      (b2) creating a buffer zone around each of the customer locations; and (b3) combining the buffer zone for each of the customer locations to form at least one aggregated area; and defining at least one polygon using the outer most boundary of the at least one aggregated area;

(c) loading data contained in the trade area data base developed in step (b) into the computer-media storage device provided in step (a);

(d) selecting a specific location within the geographical area covered by the trade area data base;

(e) withdrawing and displaying data for the selected location from the trade area data base;

(f) selecting at least a portion of the data displayed in step (e) for analysis;

(g) selecting a first set of parameters for analyzing the data selected in step (f) for the specific location selected in step (d);

(h) analyzing the data selected in step (f) with the first set of parameters selected in step (g) with the computer;

(i) storing the data analyzed in step (h) in the computer-media storage device;

(j) selecting a second set of parameters for analyzing the same data selected in step (f) for the same specific location selected in step (d);

(k) analyzing the same data selected in step (f) with the second set of parameters selected in step (j) in the computer; and (l) storing the data analyzed in step (k) in the computer-media storage device.

2. The method of claim 1 further including, subsequent to step (1), selecting another specific location within the geographical area covered by the trade area data base and repeating steps (e) through (l) for the newly selected location.

3. The method of claim 1 further including, subsequent to step (1), a step of generating at least one graphical summary report from the analyzed data stored in steps (i) and (1).

4. The method of claim 3 further including, during at least one of steps (h) and (k) a map overlay is used within the computer to filter the data being analyzed by selectively removing undesired data.

5. The method of claim 1 wherein at least one graphical summary report is generated following each of the analyses for the selected sets of parameters.

6. The method of claim 5 wherein at least one of the analyses includes generating at least one graphical summary report from the data being analyzed.

7. The method of claim 6 wherein during at least one of the analyses in step (g) includes the use of a map overlay within the computer to filter the data being analyzed by selectively removing undesired data.

8. The method of claim 1 further including, subsequent to step (1), additional development of the trade area data base to increase the size of the geographical area covered by the data base.

9. The method of claim 1, further including, during step (b1), removing one or more of the customer locations using at least one filtering criterion derived by evaluating the customer information.

10. The method of claim 9, wherein said at the one filtering criterion comprises a predefined driving distance from at least one local store of the user.

11. The method of claim 9, wherein the at least one filtering criterion comprises a particular transaction made by a customer associated with one of the customer locations.

12. The method of claim 9, wherein the at least one filtering criterion comprises a frequency of activities transacted by a customer associated with one of the customer locations.

13. The method of claim 1, further including, subsequent to step (b3), the following sub-steps:

(b4) generating a grid comprising a plurality of sections, the grid encompassing said at least one polygon;

(b5) obtaining a customer count from at least some of the plurality of sections of the grid; and (b6) identifying separately each of the at least some of the plurality of sections in accordance with the customer count.

14. The method of claim 5, wherein the at least one graphical report includes a grid comprising a plurality of sections and further wherein the report utilizes a coloring scheme to identify each section of a grid in the presentation of the data.

15. The method of claim 5, wherein the at least one graphical report includes projection of the analyzed data onto a map of at least a portion of the geographical area included in the data base.

16. The method of claim 15, wherein a coloring scheme is utilized to identify the presentation of the data in an area of the map.

* * * * *